No. 825,837. PATENTED JULY 10, 1906.
L. W. HORTON.
SEPARATOR FOR SECONDARY BATTERY PLATES.
APPLICATION FILED MAR. 17, 1904.
2 SHEETS—SHEET 1.
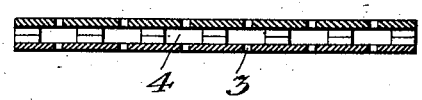
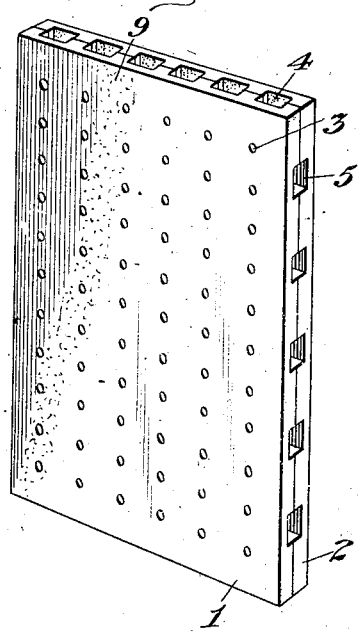
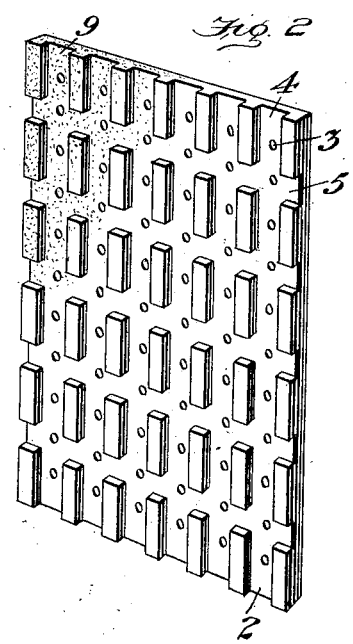
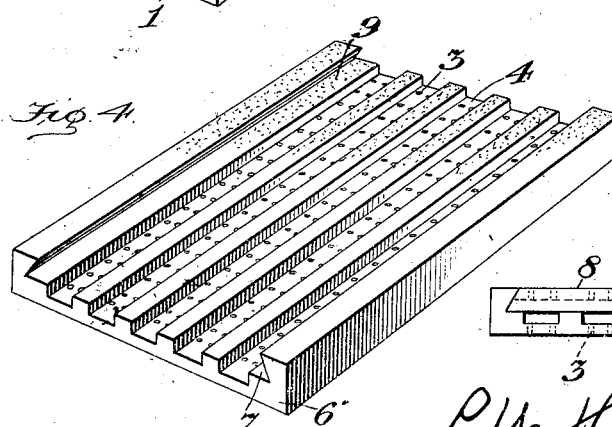
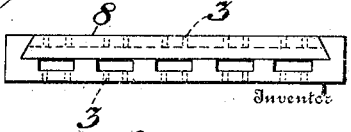
Witnesses
Edwin L. Bradford
Chas. F. Clagett
Inventor
By L. W. Horton,
Albert Stetson, Attorney No. 825,837. PATENTED JULY 10, 1906.
L. W. HORTON.
SEPARATOR FOR SECONDARY BATTERY PLATES.
APPLICATION FILED MAR. 17, 1904.
2 SHEETS—SHEET 2.
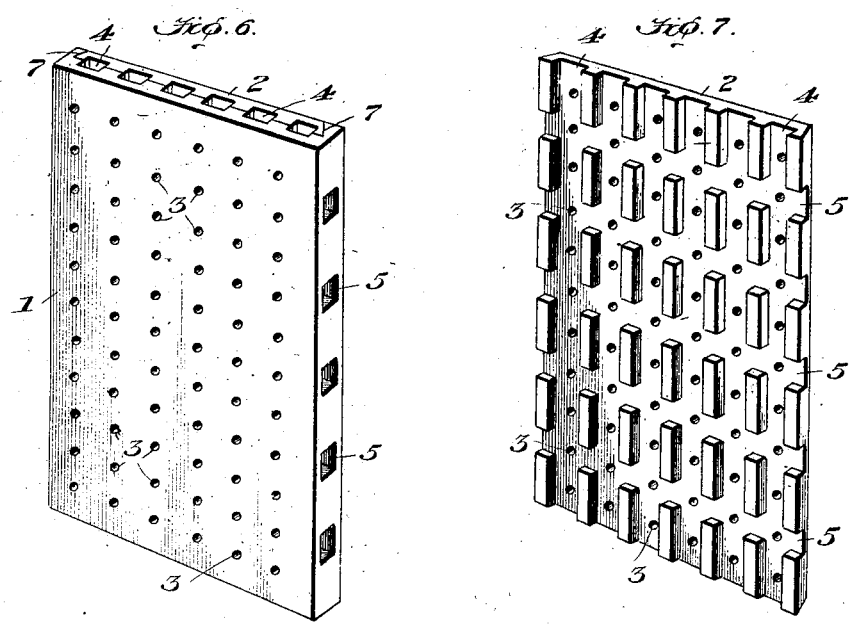
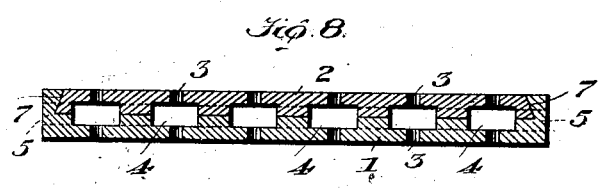

UNITED STATES PATENT OFFICE.

LEONARD WHEATON HORTON, OF PROVIDENCE, RHODE ISLAND, ASSIGNOR TO THE RHODE ISLAND ELECTROMOBILE COMPANY, OF PROVIDENCE, RHODE ISLAND, A CORPORATION OF MAINE.

SEPARATOR FOR SECONDARY-BATTERY PLATES.

No. 825,837.　　　　Specification of Letters Patent.　　　　Patented July 10, 1906.

Application filed March 17, 1904. Serial No. 198,560.

*To all whom it may concern:*

Be it known that I, LEONARD WHEATON HORTON, a citizen of the United States, residing at Providence, in the county of Providence and State of Rhode Island, have invented new and useful Improvements in Separators for Secondary-Battery Plates, of which the following is a specification.

My invention relates to separators for secondary-battery plates.

It relates particularly to a new and improved separator especially adapted for use with plates having a large surface of exposed active material.

It is also intended especially for use with batteries that are subjected at times to heavy discharges and rough uses, such conditions being met with in automobiles, autoboats, &c.

The object of the invention is to furnish a separator which shall bind and securely hold the active material in place, shall lie flat against the surface of said active material, at the same time allowing free access of the exciting fluid to the active surface and for the circulation of the acid and escape of the developed gases.

Broadly considered, my invention comprises a separator for secondary-battery plates formed of any suitable material, as hereinafter set forth, in which acid-wells are located between the bounding surfaces of said separator.

In the drawings, Figure 1 is a perspective view of the two parts of the separator united and showing the arrangement of the vertical and horizontal acid-wells. Fig. 2 is a similar view of one of the parts of the separator as shown in Fig. 1. Fig. 3 is a cross-section of Fig. 1 on the line of one of the rows of perforations of the surface of the separator. Fig. 4 is a modified construction showing one method by which the halves of the separator are held together. Fig. 5 is a cross-section through Fig. 4 when the two halves have been put together. Fig. 6 is a perspective view of the two parts of the separator, the same having both the longitudinal and transverse passages shown in Figs. 1 and 2 and also being joined together by the interlocking means illustrated in Figs. 4 and 5. Fig. 7 is a perspective view of one of the parts of the separator as shown in Fig. 6. Fig. 8 is a cross-section through the two parts of the separator joined together as shown in Fig. 6 and on the line of one of the rows of perforations 3.

Referring to the drawings, 1 and 2 represent the two halves of a separator having perforations 3 extending from the outer surface to the inclosed acid-wells formed by the longitudinal and transverse grooves 4 and 5, arranged at practically right angles to each other, their relative arrangement being shown in Fig. 2.

The two halves of the separators may be placed face to face, with abutting edges fastened together in any suitable manner, or, as shown in Fig. 4, one of the plates 6 may be provided with a beveled groove 7, into and along which the opposite half 8, being provided with beveled edges, may be slid and held in place.

The separator may be made of any suitable material, either impervious or porous; but I prefer to make it of porous material, as indicated by the dotted portions 9.

It is known to those skilled in the art that the output of a battery is greater in proportion to the amount of active material exposed to the exciting fluid; but under the chemical changes taking place in the battery the active material expands and unless supported will fall from the grid and greatly impair the efficiency of the battery. Hence, the modern storage battery is simply a compromise between too much grid and too little support for the active material. The grid or core should be merely a support and conductor and not take part in the electric action. By using my separator I am enabled to secure a maximum of active material exposed to the exciting fluid and a minimum of grid. By this means I obtain a lighter, more compact, and more efficient battery, because I can make my plates thinner, since I use practically all the active surface. It is a known fact that if a large surface battery is built light enough to meet the requirements of road-vehicles without special retaining devices for the active material it will tear itself to pieces and destroy itself by short circuits. To remedy the defects in existing structures, I proceed as follows: I make my separator of an acid-resisting material, preferably porous, with a series of acid-wells 4 5 situated within and inclosed by the bounding surfaces of the separator, the perforations 3 allowing the acid free access to the wells. When the plate is formed as in Fig. 2, the acid-wells cross each other, and this greatly assists in the circulation of the liquid and gases. It is of course evident that the transverse internal wells 5 could be omitted without departing from the spirit of my invention; but I generally prefer to use them, as they facilitate the access to the active material of an abundance of the exciting fluid.

Instead of forming the longitudinal grooves 4 in both halves of the separator I may form said grooves in one half-plate only, as shown in Fig. 4. In order, however, to provide better passage-way for the exciting fluid, I may form the transverse grooves in the other half, as shown in the dotted lines in Fig. 5. The two halves of the separator are united, so that they form a single plate.

Instead of employing two similarly-grooved parts of the separator when I make it in two parts, as shown in Figs. 1, 2, and 3, I may employ only one such part and use in connection therewith a perfectly plane part. I prefer generally to use the two similarly-grooved parts, as I thus obtain deeper acid-wells.

In Figs. 6, 7, 8 I have shown the interlocking means (illustrated in Figs. 4 and 5) applied to the separator, having both longitudinal and transverse passages, as shown in Figs. 1, 2, and 3. In Fig. 8 the transverse passages 5 are shown in dotted lines.

By using my improved perforated separator provided with the internal acid-wells I am enabled to cover and hold firmly in place the entire active surface, the only portions not covered being simply the points where the porous channels or perforations are opposite the active surface. Hence the active material cannot crack out and fall into short circuits between the plates. If the acid-wells were located next the active material, it would leave an amount of the active material equal to their areal unprotected, and under the shocks, jars, and extraordinary demands for current incident to autovehicles a considerable amount of the active material must become detached and not only useless, but injurious. The perforations and the wells are made as large and numerous as is consistent with the objects aimed at—namely, sufficient strength and perfect access to the active material of the exciting fluid.

I can make my separator of any material resisting the action of the acid of the battery, such as wood, rubber, (porous or perforated, or both porous and perforated,) celluloid, earthenware, &c.; but of course preference would be given to those materials that offer most stability consistent with the lightness desired.

My separator will be found superior to any with which I am acquainted for use with the ordinary battery-grid; but it is more especially designed for those batteries employing a maximum of active material exposed to the exciting fluid.

I prefer to use in combination with my separator a thin porous or perforated sheet—say rubber or vegetable fiber—between the separator and the positive plate, as I believe it prolongs the life of the separator by removing it farther away from the nascent oxygen that is developed at the surface of the plate during the chemical operations taking place in the battery.

My separator is shown in the drawings as composed of parts which are united; but it is evident that it could be made in one piece, whatever the material used, this being simply a detail of convenience or expense of manufacture.

Having thus fully described and illustrated my invention, what I claim is—

1. A separator for secondary-battery plates having internal acid-wells embraced within the bounding surfaces, said separator comprising two parts and arranged face to face, and means for locking said parts together.

2. A separator for secondary-battery plates having internal acid-wells embraced within its bounding surfaces, said separator comprising two parts arranged face to face and a tongue-and-groove connection between said parts.

3. A separator for secondary-battery plates having internal acid-wells embraced within its bounding surfaces, said separator comprising two parts arranged face to face and interlocking means for holding said parts together.

4. A separator for secondary-battery plates comprising two parts arranged face to face, the adjacent faces of said parts being provided with longitudinal and transverse grooves, providing intercommunicating acid-wells within the bounding surfaces of the separator.

In testimony whereof I have signed my name to this specification in the presence of two subscribing witnesses.

LEONARD WHEATON HORTON.

Witnesses:
W. B. SNOW,
A. STETSON.